United States Patent [19]
Susnjara

[11] Patent Number: 5,632,579
[45] Date of Patent: May 27, 1997

[54] PARTICULATE REMOVAL DEVICE AND SYSTEM FOR ROUTER MACHINES AND THE LIKE

[75] Inventor: Kenneth J. Susnjara, Santa Claus, Ind.

[73] Assignee: Thermwood Corporation, Dale, Ind.

[21] Appl. No.: 274,381

[22] Filed: Jul. 13, 1994

[51] Int. Cl.⁶ .............. B23Q 11/00; B23B 47/34
[52] U.S. Cl. .............. 409/137; 408/67; 451/456
[58] Field of Search .............. 409/137, 232, 409/233, 234, 132; 408/67, 68; 451/456, 354; 144/240, 250.12

[56] References Cited

U.S. PATENT DOCUMENTS

| | | | |
|---|---|---|---|
| 3,837,383 | 9/1974 | Ko | 409/137 X |
| 4,200,417 | 4/1980 | Hager et al. | 408/67 |
| 4,244,669 | 1/1981 | Puritz et al. | 409/137 |
| 4,340,326 | 7/1982 | Buonauro et al. | 408/67 X |
| 4,382,728 | 5/1983 | Anderson et al. | 409/137 |
| 4,662,117 | 5/1987 | Korwin et al. | 451/456 |
| 4,895,483 | 1/1990 | Anderson | 409/132 |
| 4,909,681 | 3/1990 | Drier, Jr. | 409/137 |
| 4,915,550 | 4/1990 | Arai et al. | 409/137 |
| 4,923,251 | 5/1990 | Funaicawa et al. | 451/354 X |
| 4,946,322 | 8/1990 | Colligan | 409/137 |
| 5,237,896 | 8/1993 | Albright et al. | 409/137 X |
| 5,292,352 | 3/1994 | Rudolf et al. | 451/456 X |
| 5,346,341 | 9/1994 | Jambor | 409/137 X |

FOREIGN PATENT DOCUMENTS

| | | | |
|---|---|---|---|
| 3733534 | 4/1989 | Germany | 408/67 |
| 0139638 | 6/1988 | Japan | 408/67 |

*Primary Examiner*—William R. Briggs
*Attorney, Agent, or Firm*—Lalos & Keegan

[57] ABSTRACT

In a machine tool having a workpiece support table and a tool head assembly provided with a tool engageable in cutting relation with a workpiece positioned on the table for removing particulate material from said workpiece, a device for removing the particulate material from the vicinity of the tool and workpiece comprising a hood member mountable on the tool head assembly, about the tool, having a lower edge spaced from the workpiece when the device is in an operative position, providing a peripheral air inlet opening communicating with a cylindrical chamber, the hood member having at least one outlet opening for receiving air drawn through the air inlet opening and swirled in the cylindrical chamber by the high speed rotation of the tool, causing the entrainment of the particulate material produced by the cutting action of the tool.

16 Claims, 2 Drawing Sheets

PARTICULATE REMOVAL DEVICE AND SYSTEM FOR ROUTER MACHINES AND THE LIKE

BACKGROUND OF THE INVENTION

This invention relates to machine tools such as routers and the like and more particularly to a device and system for removing particulate material produced by the cutting action of a tool such as a router, drill, grinder or sander.

In machine tools in which large amounts of particulate material is produced by the cutting action of a tool such as a router, drill, grinder or sander, it is required for safety and environmental reasons to remove such material from the work area. In the prior art, it typically has been the practice to remove such material by the use of a hood member mounted on the tool head assembly, encompassing the cutting tool, and a vacuum system for withdrawing the material from the interior of the hood member. Generally, such hood members have been provided with a brush disposed about the periphery of the hood member which engages the workpiece and work table to contain and accumulate the particulate material produced by the cutting tool for removal by the vacuum system. Such arrangements, however, have been found not to be entirely effective in that by causing the particulate material to be deposited and accumulated on the workpiece or work table, a substantial air flow through the exhaust opening in the hood member is required to lift and remove such accumulation of material. It thus has been found to be desirable to provide a device and system for more readily and effectively containing and removing particulate material produced by a cutting tool of a machine.

Accordingly, it is the principal object of the present invention to provide an improved device for containing and removing particulate material produced by the cutting action of a cutting tool.

Another object of the present invention is to provide an improved device for containing and removing particulate material produced by the cutting action of a tool spinning at a high speed.

A further object of the present invention is to provide an improved device for containing and removing particulate material produced by the cutting action of a high speed tool of a machine.

A still further object of the present invention is to provide an improved device for containing and removing particulate material produced by the cutting action of a high speed tool such as a router, drill, grinder, sander and the like.

Another object of the present invention is to provide an improved device for containing and removing particulate material produced by the cutting action of a high speed tool by means of a vacuum system.

A further object of the present invention is to provide an improved device for containing and removing particulate material in the vicinity of a high speed tool requiring a comparatively lesser amount of air flow than in conventional particulate removal devices.

A still further object of the present invention is to provide an improved device for containing and removing particulate material produced by the cutting action of a high speed tool which is comparatively simple in design, relatively inexpensive to manufacture and highly effective in performance.

Another object of the present invention is to provide an improved system for containing and removing particulate material produced by the cutting action of a high speed tool.

Other objects and advantages of the present invention will become more apparent to those persons having ordinary skill in the art to which the present invention pertains from the following description taken in conjunction with the accompanying drawings wherein:

DETAILED DESCRIPTION

Figure 1:
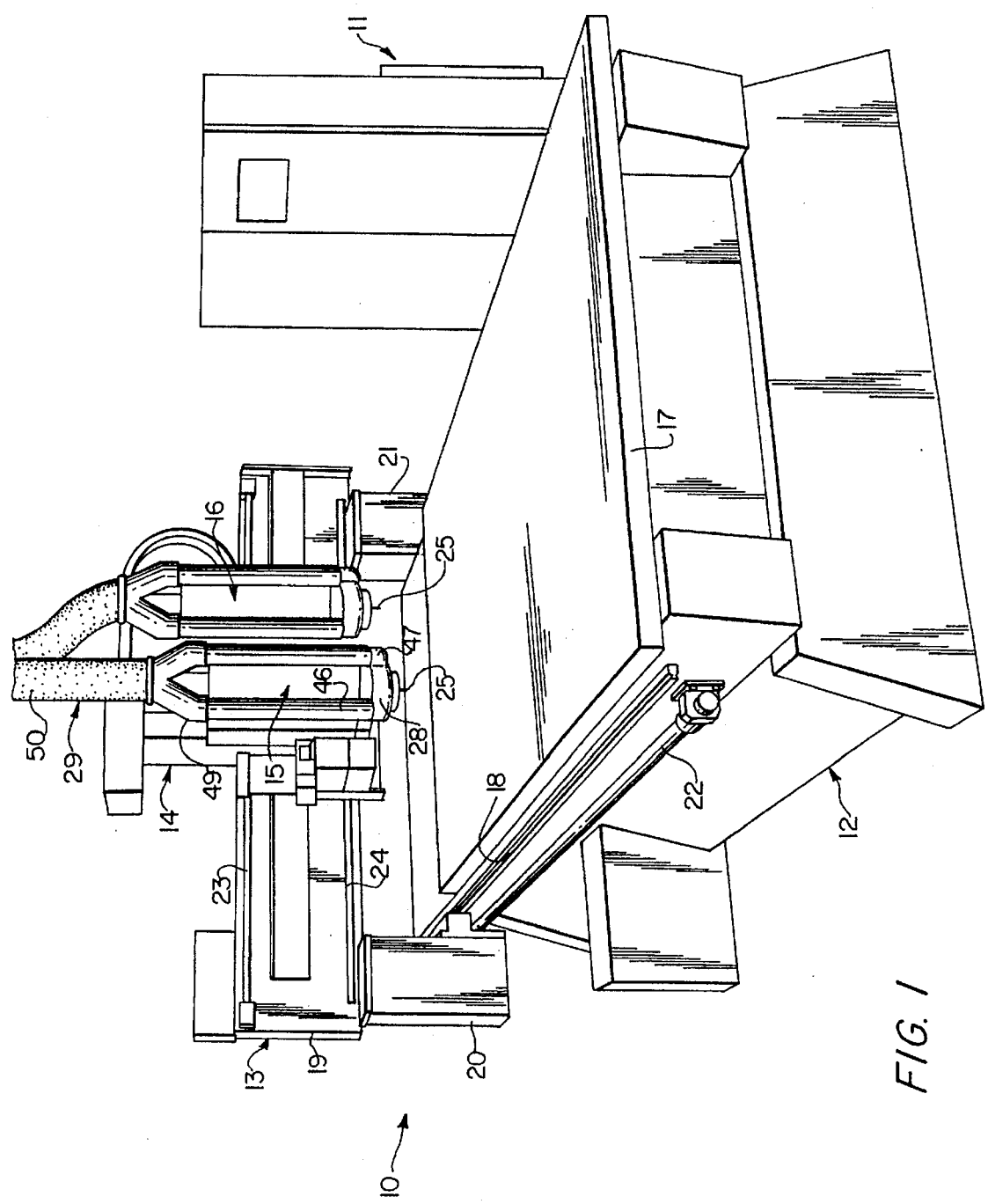
FIG. 1 is a perspective view of a computer controlled router machine equipped with a device and system for containing, removing and collecting particulate material produced by the cutting action of a router bit, embodying the present invention.

Referring to FIG. 1, there is illustrated a router machine 10 and a controller 11 operatively connected to the machine for displacing a router bit of the machine along a longitudinal line of travel or an x-axis, a transverse line of travel or a y axis and a vertical line of travel or a z-axis in accordance with a program inputted or loaded into the controller for performing a work function on one or more workpieces positioned on the machine. Generally, the machine includes a base member 12, a bridge member 13, a tool head support assembly 14 and a pair of tool head assemblies 15 and 16. The base member is provided with a work table 17 rigidly mounted on the base member and a pair of trackways 18, 18 mounted on the sides of the base member and disposed parallel to the x-axis of the machine. Work table 17 is adapted to support one or more workpieces to be machined. Such workpieces are adapted to be positioned by positioning pins or other means, and secured in position by clamps, a vacuum holddown system or any other means.

The bridge member includes a transversely disposed beam section 19 spaced above and spanning the base member, and a pair of transversely spaced, depending leg sections 20 and 21 straddling the sides of the base member and mounted on trackways 18, 18 for displacement relative to the base member along the x-axis. The bridge member is displaced relative to the base member along the x-axis by means of a pair of drive screw assemblies 22, 22 operatively interconnecting the side portions of the base member and inner side portions of leg sections 20 and 21.

Tool head support assembly 14 is supported on and guided along a pair of transversely disposed, vertically spaced trackways 23 and 24 provided on a front face of transverse beam section 19, and is displaceable along the y-axis by a drive screw assembly operatively interconnecting the bridge member and the tool head support assembly. Each of the tool head assemblies is supported and displaceable along transversely spaced, vertically disposed trackways mounted on support assembly 14, and is adapted to be displaced by a drive screw assembly operatively interconnecting the support assembly and a tool head assembly. Each of the tool head assemblies further is provided with a router bit 25 adapted to be displaced along the x, y and z axes to provide a cutting pattern 26 in a workpiece 27 supported on the work table, as shown in FIG. 3, to produce particulate material consisting of wood, plastic or non-ferrous metallic particles which become airborne due to the high speed rotary motion of the router bit.

The airborne particulate material produced by the cutting action of the router bit is contained and removed by a particulate removal system consisting of a hood device 28, a pneumatic conveying assembly 29, a filter collector and a vacuum pump.

Figure 2:
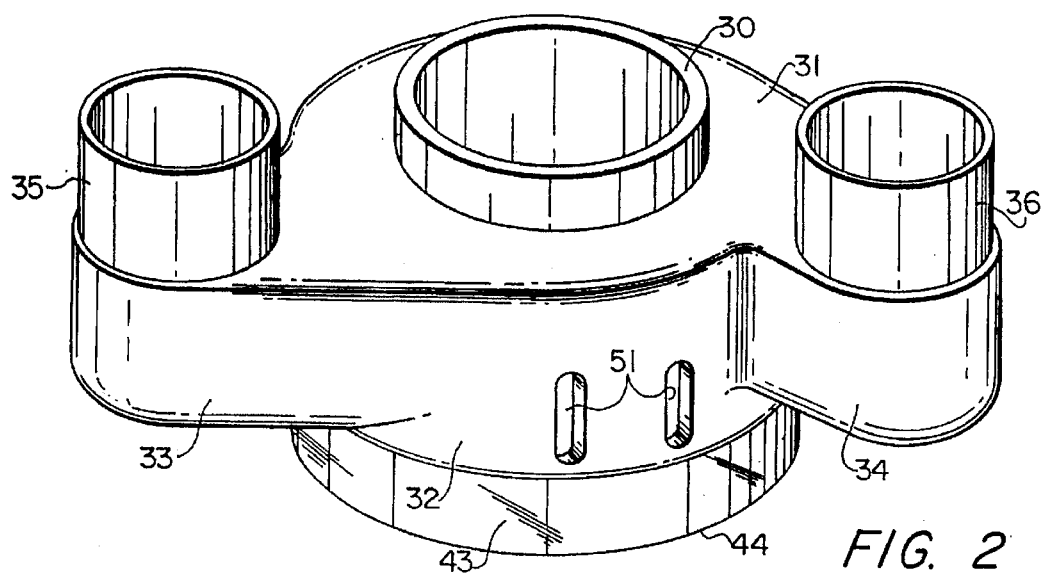
FIG. 2 is an enlarged, perspective view of the device shown in FIG. 1.
Figure 3:
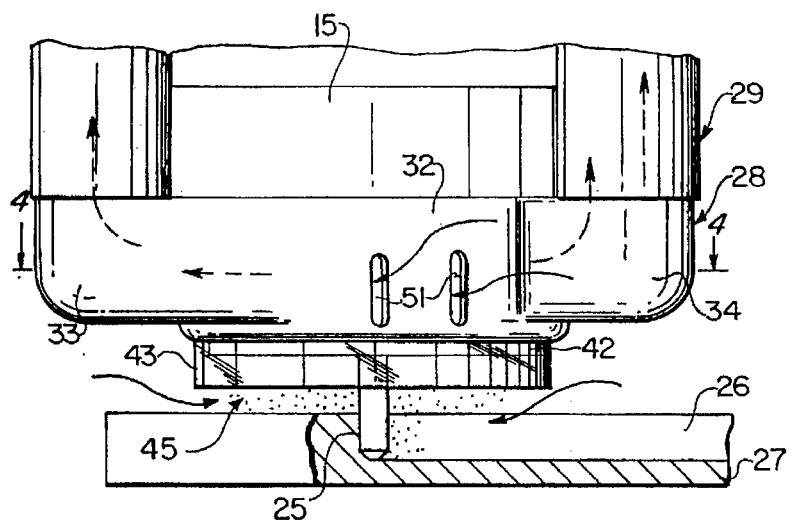
FIG. 3 is a side elevational view of the device shown in FIG. 3.
Figure 4:
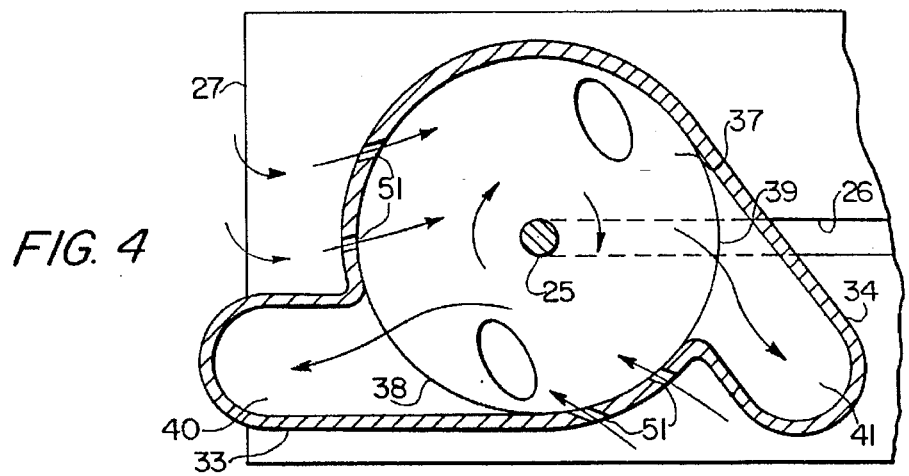
FIG. 4 is a cross-sectional view taken along line 4—4 in FIG. 3.

As best shown in FIGS. 2 through 4, hood device 28 includes an upper, annular mounting flange section 30 mountable on the lower end of a tool head assembly, coaxially with router bit 25, an annular upper wall section 31 and an annular side wall section 32 also disposed coaxially relative to the router bit when the device is mounted on the tool head assembly in depending relation. The side wall section of the device is provided with a pair of tangentially disposed portions 33 and 34 curving upwardly and terminating in a pair of upwardly opening tubular conduit portions 35 and 36 disposed substantially parallel to the axis of side wall section 32. When mounted in an operative position on the lower end of a tool head assembly, such structure provides a cylindrical chamber 37 communicating through a pair of outlet openings 38 and 39 and tangentially disposed passageways 40 and 41 with tubular conduit portions 35 and 36. The transition portions of upper wall section 31, side wall section 32 and tangentially disposed portions 33 and 34 are smoothly rounded to facilitate the flow of air through the device.

Mounted on a depending, annular lip portion 42 of side wall section 32 is an annular skirt member 43 preferably formed of a clear, semi-flexible plastic material, having a lower annular edge 44 adapted to be positioned in spaced relation to the upper surface of the workpiece when in the operative position, to provide an annular, primary air inlet opening 45.

As best shown in FIG. 1, the pneumatic conveying assembly 29 includes a pair of tubular conduits 46 and 47 mounted on the tool head assembly and communicating at their lower ends with tubular conduit portions 35 and 36, a merging section 48 supported on and communicating with tubular conduits 46 and 47 and a flexible conduit 50 communicating merging section 49 with an inlet of a filter collector on the upstream side of the vacuum pump.

In the operation of the particulate material containment and removal device and system as described, the vacuum pump is first started to draw air through the lower opening of device 28 provided by annular skirt 43, chamber 37, tangential passageways 40 and 41, tubular portions 35 and 36 and conduits 46, 47, 48 and 50 to the filter collector. When command signals are then transmitted from the controller to the drive motors of the machine, a tool head assembly and associated router bit will be positioned and advanced as shown in FIG. 3 with lower edge 44 of the skirt member being spaced from the upper surface of workpiece 27 to provide primary air inlet opening 45, and the router bit cutting a pattern 26 in the workpiece. As the router bit spins at a high speed and cuts through the workpiece, the particulate material produced by the cutting action will become airborne and caused to be entrained in air drawn through primary air inlet opening 45. The air flow with the entrained particulate material will flow upwardly in chamber 37 with a swirling motion and be caused to flow outwardly through tangential passageways 40 and 41 and through the conduit assembly to the filter collector. The entrainment, containment and motion of the particulate material produced by the cutting action of the tool bit is caused by a combination of the spinning motion of the tool bit which causes the particles of the cut material to become airborne and entrained in a whirling airstream and the induction of air drawn radially inwardly through primary annular inlet opening 45 which functions to enhance the entrainment of the particles and further cause them to be contained within the upwardly swirling air stream.

As best shown in FIGS. 2 through 4, wall section 32 is provided with a plurality of air inlet openings 51 through which secondary air is drawn and caused to swirl thus accelerating the flow of primary air drawn through annular opening 45 with the entrained particulate material, and further functioning to contain the air flow and maintain the entrainment of the material to assist in its removal. For ideal operating conditions, the area of air inlet opening 45 should be substantially equal to the area of outlet openings 38 and 39.

Hood device 28 may be formed of any suitable material and fabricated by any conventional method. Preferably, the device is of a one-piece molded plastic construction. The skirt member may be formed of any plastic material and preferably of a clear plastic material to allow viewing of the router tool and the cut produced by the cutting action of the tool. The components of the pneumatic conduit assembly also may be formed of any suitable plastic materials. Preferably, the entire particle removal system will be formed of lightweight materials since they are supported on the tool head assembly.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In a machine tool having a workpiece support table and a tool head assembly provided with a tool engageable in cutting relation with a workpiece positioned on said table for removing particulate material from said workpiece, a device for removing said particulate material from the vicinity of said tool and workpiece comprising:

air drawing means for drawing air into a hood member; and a hood member mountable on said tool head assembly, about said tool, having a lower edge spaced from said workpiece when said device is in an operative position, providing a peripheral air inlet opening at said lower edge communicating with a chamber defined by said hood member, said member having at least one outlet opening for receiving air drawn by said air drawing means through said air inlet opening and swirled in said chamber by the high speed rotation of said tool, causing the entrainment of said particulate material produced by the cutting action of said tool; and wherein the area of said peripheral air inlet opening is substantially equal to the area of said outlet opening.

2. A device according to claim 1 wherein said hood member consists of a singular molded member.

3. A device according to claim 1 wherein said hood member includes a conduit portion providing a passageway communicating with said at least one outlet opening and disposed tangentially relative to said chamber.

4. A device according to claim 1 wherein said hood member includes a pair of outlet openings communicating with said chamber.

5. A device according to claim 4 wherein said hood member includes a pair of conduit portions, each providing a passageway communicating with one of said outlet openings and disposed tangentially relative to said chamber.

6. A device according to claim 1 wherein said hood member includes at least one secondary air inlet opening through which air is drawn into said chamber for enhancing the entrainment of said particulate material.

7. A device according to claim 6 wherein said hood member consists of a singular molded member.

8. A device according to claim 6 wherein said hood member includes a conduit portion providing a passageway communicating with said outlet opening and disposed tangentially relative to said chamber.

9. A device according to claim 6 wherein said hood member includes a pair of outlet openings communicating with said chamber.

10. A device according to claim 9 wherein said hood member includes a pair of conduit portions each providing a passageway communicating with one of said outlet openings and disposed tangentially relative to said chamber.

11. A device according to claim 1 wherein said member is provided with a skirt having a lower peripheral edge spaced from said workpiece when said member is in an operative position to provide said peripheral air inlet opening.

12. In a machine tool having a workpiece support table and a tool head assembly provided with a tool engageable in cutting relation with a workpiece positioned on said table for removing particulate material from said workpiece, a system for removing said particulate material from the vicinity of said tool and workpiece comprising:

a hood member mountable on said tool head assembly, about said tool, having a lower edge thereof spaced from said workpiece when said device is in an operative position, providing a peripheral air inlet opening at said lower edge communicating with a cylindrical chamber defined by said member, said hood member having at least one outlet opening for receiving air drawn through said air inlet opening and swirled in said annular chamber by the high speed rotation of said tool, causing the entrainment of said particulate material produced by the cutting action of said tool;

a vacuum pump; and pneumatic conveying means operatively interconnecting the outlet opening of said hood member and an inlet of said vacuum pump, including a filter collector disposed on an upstream side of said pump; and wherein the area of said peripheral air inlet opening of said hood member is approximately equal to the area of said outlet opening of said hood member.

13. A system according to claim 12 wherein said hood member includes at least one secondary air inlet opening through which air is drawn into said annular chamber to accelerate the swirling flow of primary air drawn through said first mentioned air inlet opening.

14. A system according to claim 12 wherein said hood member includes a pair of outlet openings communicating with said cylindrical chamber.

15. A system according to claim 12 wherein said hood member includes a conduit portion providing a passageway communicating with said outlet opening and disposed tangentially relative to said cylindrical chamber.

16. A system according to claim 14 wherein said hood member includes a pair of conduit sections each providing a passageway communicating with one of said outlet openings and disposed tangentially relative to said cylindrical chamber.

\* \* \* \* \*